US011971672B2

(12) United States Patent
Yokota et al.

(10) Patent No.: US 11,971,672 B2
(45) Date of Patent: Apr. 30, 2024

(54) SHEET CONVEYING DEVICE AND IMAGE FORMING APPARATUS

(71) Applicant: CANON KABUSHIKI KAISHA, Tokyo (JP)

(72) Inventors: Akinori Yokota, Tokyo (JP); Osamu Sasaoka, Kanagawa (JP); Toshiyuki Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/062,142

(22) Filed: Dec. 6, 2022

(65) Prior Publication Data

US 2023/0176509 A1 Jun. 8, 2023

(30) Foreign Application Priority Data

Dec. 8, 2021 (JP) ................................ 2021-199604

(51) Int. Cl.
*B65H 5/38* (2006.01)
*B65H 5/06* (2006.01)
(Continued)

(52) U.S. Cl.
CPC ......... *G03G 15/2028* (2013.01); *B65H 5/068* (2013.01); *B65H 5/38* (2013.01);
(Continued)

(58) Field of Classification Search
CPC ........... G03G 15/2028; G03G 15/6529; G03G 15/6555; G03G 15/6573; G03G 21/203;
(Continued)

(56) References Cited

U.S. PATENT DOCUMENTS

| | | | | |
|---|---|---|---|---|
| 2008/0073831 A1* | 3/2008 | Niioka | B65H 5/38 | 271/228 |
| 2013/0272744 A1* | 10/2013 | Wakayama | G03G 21/203 | 399/97 |

(Continued)

FOREIGN PATENT DOCUMENTS

| | | |
|---|---|---|
| JP | S59030155 U | 2/1984 |
| JP | H06214481 A | 8/1994 |

(Continued)

*Primary Examiner* — Sophia S Chen
(74) *Attorney, Agent, or Firm* — ROSSI, KIMMS & McDOWELL LLP

(57) ABSTRACT

Provided is a sheet conveying device including: a conveying portion; and a first conveying guide, the first conveying guide forming a conveying path above a heating portion and having a curved portion for forming a curved path in the conveying path and a plurality of ribs provided on a surface of the curved portion, the plurality of ribs extending along a conveying direction and including a first rib and a second rib adjacent to the first rib, wherein the second rib is arranged to be deviated from the first rib in a width direction and the conveying direction, and wherein in the conveying direction, a second upstream end of the second rib being positioned between a first upstream end and a first downstream end of the first rib, the first downstream end being positioned between the second upstream end and a second downstream end of the second rib.

20 Claims, 12 Drawing Sheets

(51) Int. Cl.
*B65H 29/52* (2006.01)
*G03G 15/00* (2006.01)
*G03G 15/20* (2006.01)

(52) U.S. Cl.
CPC ......... *B65H 29/52* (2013.01); *G03G 15/6573* (2013.01); *B65H 2301/514* (2013.01); *B65H 2301/51432* (2013.01); *B65H 2404/11* (2013.01); *B65H 2801/03* (2013.01)

(58) Field of Classification Search
CPC .......... G03G 2215/00675; B65H 5/068; B65H 5/38; B65H 2301/514; B65H 2301/51432; B65H 2404/11; B65H 2801/03; B65H 29/52; B65H 2301/33312; B65H 2401/14; B65H 2401/242; B65H 2404/1115; B65H 2404/5213; B65H 2404/611; B65H 2404/54
See application file for complete search history.

(56) References Cited

U.S. PATENT DOCUMENTS

| | | | | |
|---|---|---|---|---|
| 2015/0091235 | A1* | 4/2015 | Noso | G03G 15/6573 271/3.2 |
| 2015/0205252 | A1* | 7/2015 | Namba | G03G 21/203 399/107 |
| 2022/0026836 | A1* | 1/2022 | Kubo | G03G 15/2028 |

FOREIGN PATENT DOCUMENTS

| | | | |
|---|---|---|---|
| JP | 2002060111 | A | 2/2002 |
| JP | 2003312918 | A | 11/2003 |
| JP | 2014149365 | A | 8/2014 |
| JP | 2015203795 | A | 11/2015 |

* cited by examiner

SHEET CONVEYING DEVICE AND IMAGE FORMING APPARATUS

BACKGROUND OF THE INVENTION

Field of the Invention

The present invention relates to an image forming apparatus such as a printer, a copier, and a facsimile machine using an electrophotographic system or an electrostatic recording system, and a sheet conveying device that is provided in an image forming apparatus and conveys a sheet-shaped recording material.

Description of the Related Art

Conventionally, in an image forming apparatus that forms an image on a recording material such as a sheet using toner in an electrophotographic image forming process, heat and pressure are applied to a sheet, on which a toner image has been formed, to fix the toner image onto the sheet. In such an image forming apparatus, there is a case that moisture-containing air flows to a sheet conveying device that conveys a recording material as moisture in the heated recording material evaporates, and the moisture in the air condenses to cause the adhesion of water droplets onto a conveying path in the sheet conveying device. The adhesion of water droplets onto a recording material may cause various printing problems such as an image defect due to a toner image stain, the occurrence of a sheet jam or a sheet wrinkle due to the deformation of a sheet resulting from water droplets, an accommodation failure on a sheet discharging tray, and damage on a sheet itself. In view of this, Japanese Patent Application Laid-open No. 2015-203795 discloses a configuration in which a water droplets retention form is provided between a plurality of conveying ribs provided on a conveying path to suppress the drop of water droplets and reduce the amount of water droplets adhering to a recording material. However, when water droplets adhere onto conveying ribs that are provided on the conveying path and extend long in the conveying direction of the recording material, a large amount of water droplets adhere from the conveying ribs to the same spot of the recording material, which becomes a factor for causing a printing problem such as an image defect. On the other hand, in a configuration in which conveying ribs are arranged obliquely with respect to a conveying direction as disclosed in Japanese Patent Application Laid-open No. 2003-312918, water droplets adhering to a recording material are dispersed in the width direction of a recording material, which makes it possible to suppress the occurrence of a printing problem.

SUMMARY OF THE INVENTION

However, when a conveying guide that is mainly manufactured by injection molding and constitutes a conveying path is curved, it is difficult to arrange ribs obliquely with respect to a conveying direction on the curved portion of the conveying guide due to the constraints of a mold such as an undercut.

Therefore, the present invention has an object of suppressing the occurrence of a printing problem due to water droplets adhering to a recording material using an injection-molded conveying guide.

In order to achieve the above object, there is provided a sheet conveying device provided in an image forming apparatus according to the present invention, the image forming apparatus having an image forming portion that forms an image on a sheet-shaped recording material and a heating portion that heats the recording material, the sheet conveying device including:

a conveying portion configured to convey the recording material; and an injection-molded first conveying guide, the first conveying guide forming a conveying path, through which the recording material passes, above the heating portion and having a curved portion for forming a curved path in at least a part of the conveying path and a plurality of ribs provided on a surface of the curved portion configured to face the recording material, the plurality of ribs extending along a conveying direction of the recording material and including a first rib and a second rib adjacent to the first rib, wherein the second rib is arranged to be deviated from the first rib in a width direction orthogonal to the conveying direction and the conveying direction so as to be spaced apart from the first rib, and wherein in the conveying direction, the first rib has a first upstream end and a first downstream end and the second rib has a second upstream end and a second downstream end, the second upstream end being positioned between the first upstream end and the first downstream end, the first downstream end being positioned between the second upstream end and the second downstream end.

According to the present invention, it is possible to suppress the occurrence of a printing problem due to water droplets adhering to a recording material using an injection-molded conveying guide.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Examples of image forming apparatuses to which the present invention is applicable include printers, copiers, or the like using an electrophotographic system or an electrostatic recording system. Here, a case in which the present invention is applied to a laser printer will be described.

First Embodiment

Description of Entire Image Forming Apparatus

Figure 1:
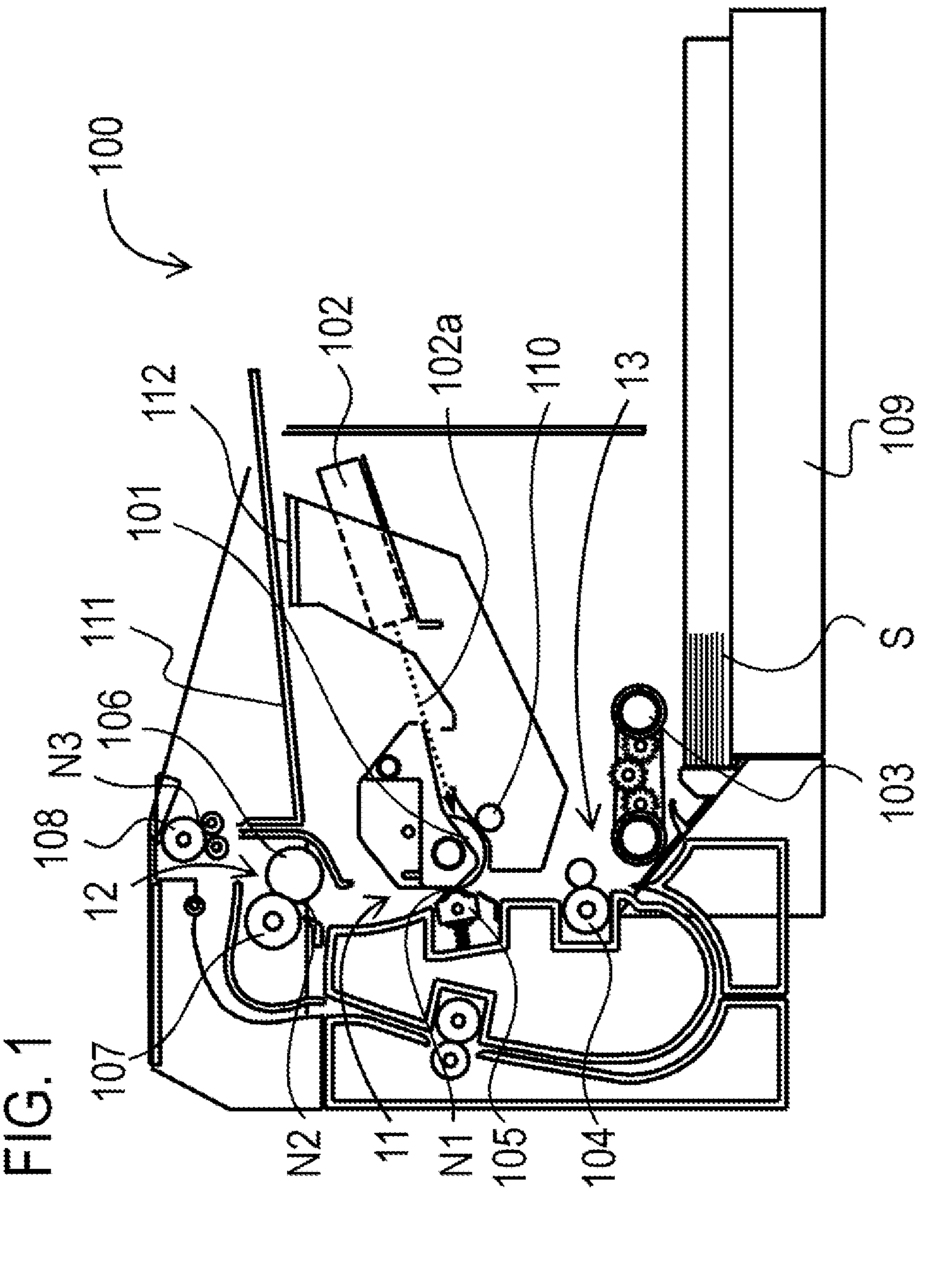
FIG. 1 is a schematic cross-sectional view of an image forming apparatus according to a first embodiment.

An image forming apparatus 100 according to a first embodiment of the present invention will be described. FIG. 1 is a schematic cross-sectional view of the image forming apparatus 100 in the present embodiment. The image forming apparatus 100 includes an image forming portion 11 that forms a toner image on a conveying sheet S serving as a sheet-shaped recording material, a fixation portion 12 that fixes the toner image onto the conveying sheet S, and a sheet conveying device 13 that conveys the conveying sheet S. The sheet conveying device 13 includes a plurality of conveying guides that form a conveying path and a conveying portion that includes rollers or the like.

First, an image forming operation in the image forming portion 11 of the image forming apparatus 100 will be described. A photosensitive drum (image bearing member) 101 provided in the image forming portion 11 is irradiated with laser light 102*a* by a laser scanner unit (optical scanning apparatus) 102 according to image information instructed from external equipment or the like, and an electrostatic latent image is formed on the photosensitive drum 101. The electrostatic latent image formed on the photosensitive drum 101 is developed as a toner image by a developing roller 110 using toner.

Meanwhile, a conveying sheet S accommodated in a feeding-sheet loading tray 109 is separated one by one by a separation portion including a sheet feeding roller 103 and fed to the image forming portion 11. Then, the conveying sheet S is conveyed to a transfer nip portion N1 formed by the photosensitive drum 101 and a transfer roller 105 through the conveying roller 104, and a toner image is transferred onto the conveying sheet S. The conveying sheet S onto which the toner image has been transferred is conveyed to the fixation portion 12, and heated and pressed at a fixation nip portion N2 formed by a film unit 106 and a pressing roller 107. As a result, the toner image is fixed onto the conveying sheet S. The conveying sheet S onto which the toner image has been fixed is discharged to a sheet discharging tray 111 by a sheet discharging roller 108.

Note that the image forming apparatus 100 of the present embodiment has a configuration as a toner replenishment type in which a user replenishes toner via a toner replenishment port 112. However, the image forming apparatus 100 may also have a similar configuration even in the case of a process cartridge replacement type in which a photosensitive drum, a developing roller, and toner are integrally replaced.

Further, the above image forming apparatus describes as a representative example a monochrome laser printer that uses monochrome toner. However, the application of the present invention is not limited to this and is also applicable to a tandem-type color laser printer in which color toner of at least two colors is transferred onto a recording material via an intermediate transfer belt to form an image.

Entire Configuration of Fixation Portion 12

Figure 2:
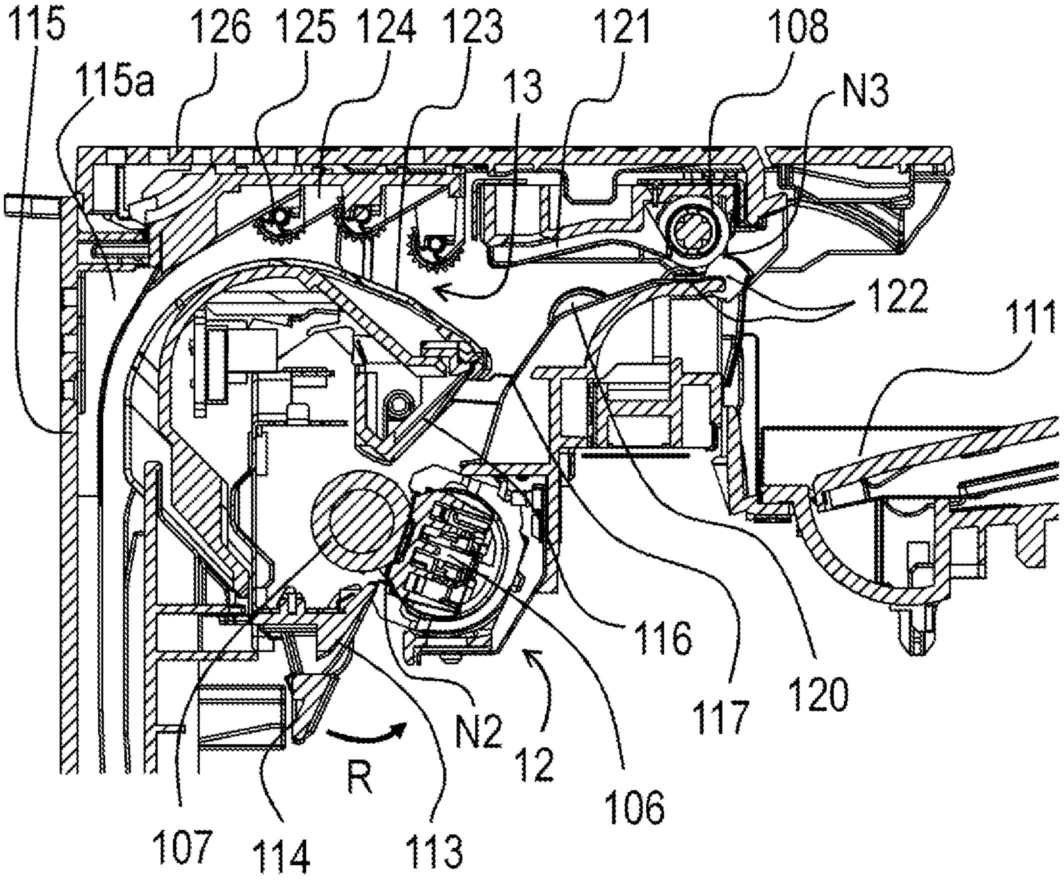
FIG. 2 is a cross-sectional view of a fixation portion and peripheral members according to the first embodiment.

The fixation portion 12 serving as a heating portion that heats the conveying sheet S will be described in detail. FIG. 2 is a cross-sectional view showing the fixation portion 12 and peripheral members. The fixation portion 12 has a film unit 106 in which a heater is provided inside a cylindrical film and the pressing roller 107, and the film unit 106 and the pressing roller 107 contact each other to form the fixation nip portion N2. On the upstream side in the conveying direction of the conveying sheet S of the fixation portion 12, an entrance guide 113 and a shutter 114 are provided. The shutter 114 is attached to be rotatable with respect to the entrance guide 113 so that the user is prevented from carelessly touching the film unit 106. The shutter 114 rotates with the opening/closing of a rear surface door 115. When the rear surface door 115 is open, the shutter 114 is rotated in a direction as indicated by an arrow R and brought into a closed state to prevent the user from touching the film unit 106 or the like.

On the downstream side in the conveying direction of the fixation portion 12, a separation guide 116 and a sheet discharging lower guide 117 are provided. A sheet discharging lower guide roller 120 is attached to the sheet discharging lower guide 117 and guides the conveying sheet S conveyed from the fixation nip portion N2. On the downstream side in the conveying direction of the separation guide 116, a sheet discharging upper guide 121 is provided facing the sheet discharging lower guide 117. The sheet discharging upper guide 121 forms a conveying path to the sheet discharging tray 111 together with the sheet discharging lower guide 117. A sheet discharging roller 108 provided on the sheet discharging upper guide 121 forms a sheet discharging nip portion N3 together with sheet discharging rollers 122 provided facing the sheet discharging roller 108, and conveys the conveying sheet S to the sheet discharging tray 111.

On the downstream side in the conveying direction of the separation guide 116, a conveying path used to convey the conveying sheet S of which the first side has completed image fixation at the fixation portion 12 to the image forming portion 11 again at double-sided printing is provided apart from the conveying path to the sheet discharging tray 111. The conveying path for double-sided printing is formed by a first conveying guide 123 and a second conveying guide 124 and at least partially includes a curved path. The first conveying guide 123 having a curved portion for forming the curved path is positioned above the fixation portion 12 or the separation guide 116.

Figure 3A:
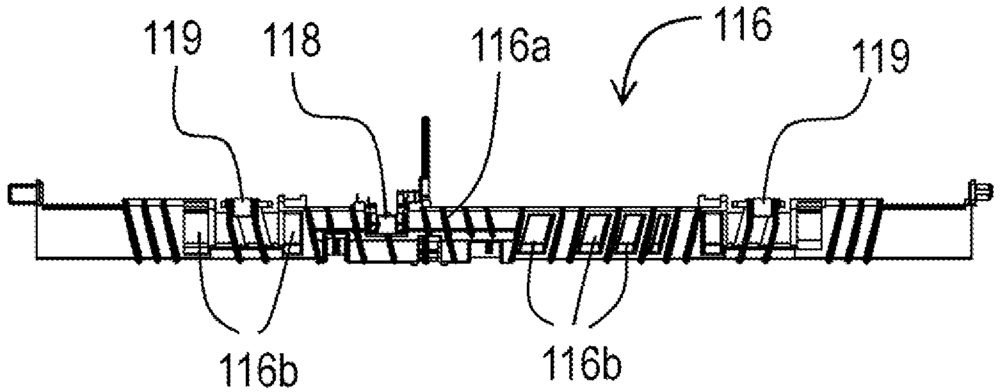
FIGS. 3A and 3B are views showing a separation guide according to the first embodiment.
Figure 3B:
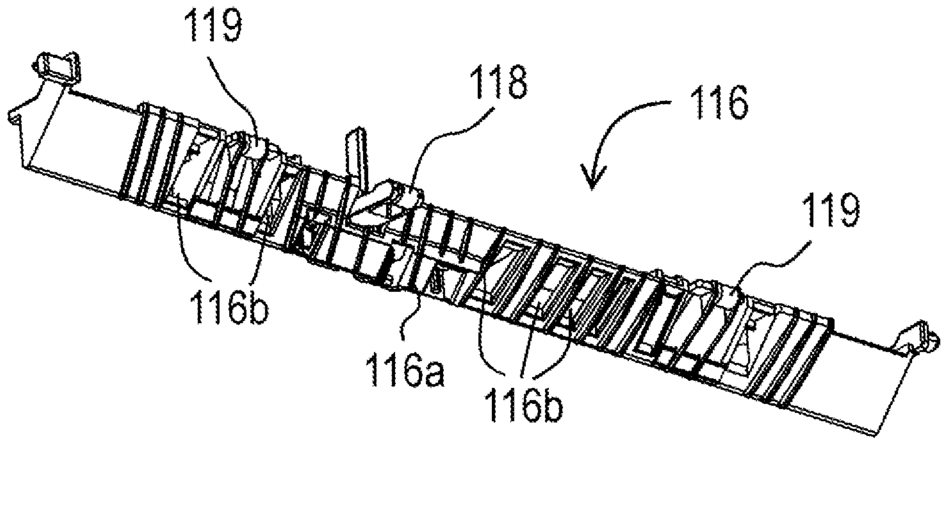

Next, the configurations of conveying guides forming the respective conveying paths will be described in detail. FIG. 3A is a plan view of the separation guide 116. FIG. 3B is a perspective view of the separation guide 116. The separation guide 116 has conveying ribs 116*a* on its surface facing the conveying sheet S. A sheet discharging sensor 118 is attached to the separation guide 116 and detects the conveying sheet S immediately after the conveying sheet S has passed through the fixation portion 12. Further, separation guide rollers 119 are attached to the separation guide 116 and prevent toner on a first side of the conveying sheet S from adhering to the conveying ribs 116*a* provided on the separation guide 116 at double-sided printing.

When the conveying sheet S is heated at the fixation portion 12, moisture contained in the conveying sheet S evaporates and mixes into air and further causes condensation, whereby water droplets may adhere to the conveying paths. Since heated air is directed upward, water droplets are particularly liable to adhere to the conveying paths positioned above the fixation portion 12. If the amount of water droplets adhering from conveying ribs to a conveying sheet is small, the water droplets evaporate soon and therefore a printing problem such as an image defect does not occur. However, in a case in which conveying ribs extend long along a conveying direction, water droplets continue to adhere to the same spot in the width direction of a conveying sheet, which may cause a printing problem due to the adhesion of a large amount of the water droplets. In view of the problem, the conveying ribs 116*a* of the present embodiment are arranged obliquely on the separation guide 116 so as to have a prescribed angle with respect to the conveying direction. Since the conveying ribs are long in the conveying direction but arranged obliquely, it is possible to disperse water droplets adhering from the conveying ribs to the conveying sheet S in a width direction orthogonal to the conveying direction. That is, since a large amount of water droplets do not adhere to the same spot of the conveying sheet S in the width direction, it is possible to suppress the occurrence of a printing problem due to the adhesion of water droplets compared with a case in which the conveying ribs are arranged along the conveying direction. Further, the separation guide 116 is provided with ventilation holes 116*b*. Since steam generated when the conveying sheet S is heated at the fixation portion 12 flows upward together with heated air by the ventilation holes 116*b*, the adhesion of water droplets to the separation guide 116 is suppressed.

Figure 4:
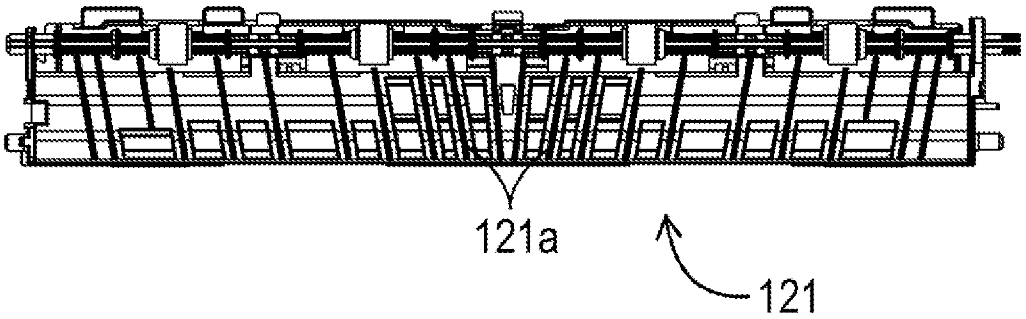
FIG. 4 is a view showing a sheet discharging upper guide according to the first embodiment.

FIG. 4 is a plan view of the sheet discharging upper guide 121. The sheet discharging upper guide 121 has conveying ribs 121*a* on its surface facing the conveying sheet S. Like the separation guide 116, the plurality of conveying ribs 121*a* are arranged obliquely with respect to the conveying direction on the sheet discharging upper guide 121. Since the conveying ribs 121*a* are arranged obliquely with respect to the conveying direction, it is possible to disperse water droplets adhering from the conveying ribs 121*a* to the conveying sheet S in the width direction even in a case in which the water droplets adhere onto the conveying ribs 121*a*.

Figure 5A:
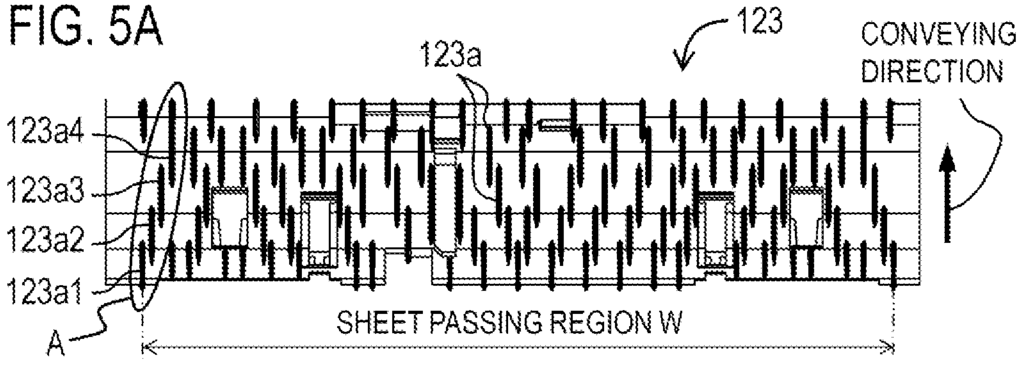
FIGS. 5A and 5B are views showing a first conveying guide according to the first embodiment.
Figure 5B:
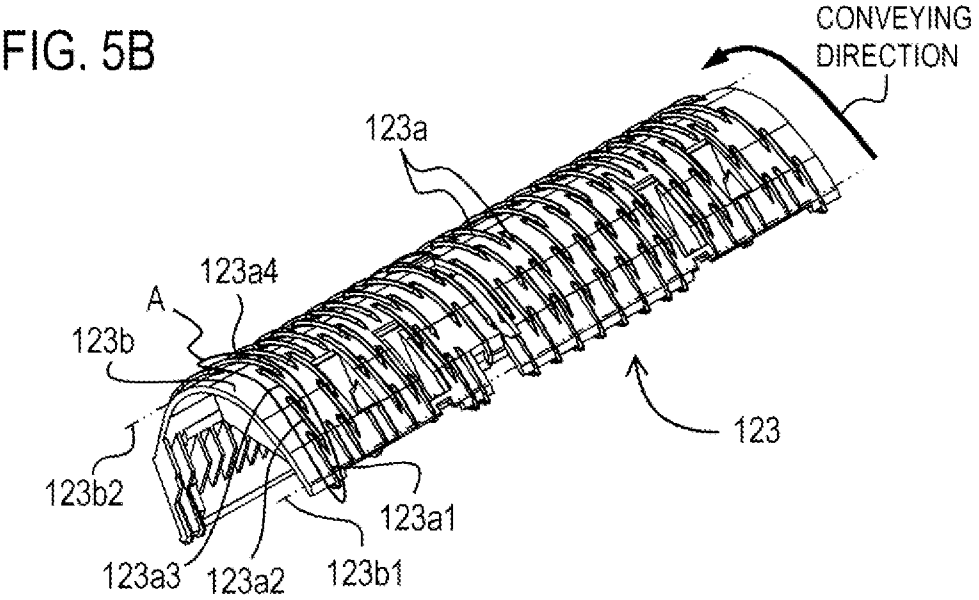

FIG. 5A is a plan view of the first conveying guide 123 having the characteristic configuration of the present invention. FIG. 5B is a perspective view of the first conveying guide 123. The first conveying guide 123 has a curved portion 123*b* in which the surface facing the conveying sheet S is curved in a protruding shape, and forms a curved conveying path that is positioned on the inner peripheral side of the curved path in the conveying path and used to convey the conveying sheet S of which the first side has completed image fixation to the image forming portion 11 again. Since water droplets also possibly adhere onto the first conveying guide 123, conveying ribs are preferably arranged obliquely with respect to the conveying direction like the separation guide 116 or the sheet discharging upper guide 121 to suppress the occurrence of a printing problem. The curved portion 123*b* is curved from an upstream side to a downstream side in the conveying direction. However, in the first conveying guide 123 manufactured by injection molding, it is extremely difficult to mold the conveying ribs obliquely with respect to the conveying direction on the curved portion 123*b* due to the constraints of a mold such as an undercut. Moreover, it is not preferable to manufacture a curved conveying guide equipped with oblique conveying ribs according to another method such as a cutting process in consideration of costs or the like.

On the other hand, in the first conveying guide 123 according to the present embodiment, the plurality of conveying ribs 123*a* extending along the conveying direction are provided discretely so as to be spaced apart from each other as shown in FIG. 5A. That is, when portions that do not contact the conveying sheet S in the first conveying guide 123 are assumed as non-contact portions, the respective conveying ribs 123*a* are entirely surrounded by the non-contact portions. In other words, when portions capable of contacting the conveying sheet S are assumed as contactable portions, the contactable portions in the first conveying guide 123 are not provided between the adjacent conveying ribs 123*a*. The length of the respective conveying ribs 123*a* in the conveying direction is shorter than that of the curved portion 123*b* of the first conveying guide 123 in the conveying direction.

The plurality of conveying ribs 123*a* are provided discretely from an upstream end 123*b*1 in the conveying direction to a downstream end 123*b*2 in the conveying direction on the curved portion 123*b*. Further, in a width direction orthogonal to the conveying direction, the plurality of conveying ribs 123*a* are provided discretely from one end to the other end in a sheet passing region W in the image forming apparatus 100 in which a conveying sheet of a maximum passable size passes through so that conveying sheets of different sizes may be appropriately conveyed. Note that it is possible to adequately change a provided range of conveying ribs in a sheet passing region on a conveying guide in consideration of the conveyability of conveying sheets.

Here, with attention paid to the plurality of conveying ribs 123*a* provided at positions close to each other in a region A shown in FIG. 5A, the positional relationship between the conveying ribs 123*a* will be described in detail. In the present embodiment, the plurality of conveying ribs 123*a* are arranged intermittently in the region A. With a conveying rib positioned on the most upstream side in the conveying direction called a first rib 123*a*1 and a rib adjacent to the first rib 123*a*1 in the width direction called a second rib 123*a*2 among the conveying ribs 123*a* in the region A, the relationship between the adjacent conveying ribs will be described. In the conveying direction, the first rib 123*a*1 has a first upstream end and a first downstream end, and a second rib 123*a*2 has a second upstream end and a second downstream end. The first rib 123*a*1 and the second rib 123*a*2 are arranged so that the second upstream end is positioned between the first upstream end and the first downstream end and the first downstream end is positioned between the second upstream end and the second downstream end in the conveying direction. That is, the first rib 123*a*1 and the second rib 123*a*2 are arranged to partially overlap each other when seen in the width direction. Since the first rib 123*a*1 and the second rib 123*a*2 are provided so as not to be spaced apart from each other in the conveying direction with this arrangement, it is possible to appropriately convey the conveying sheet S. The conveying sheet S is conveyed while contacting at least any one of the first rib 123*a*1 and the second rib 123*a*2. Moreover, a third rib 123*a*3 positioned on the downstream side in the conveying direction of the second rib 123*a*2 and a fourth rib 123*a*4 positioned on the downstream side in the conveying direction of the third rib 123*a*3 are provided in the region A. The first rib 123*a*1, the second rib 123*a*2, the third rib 123*a*3, and the fourth rib 123*a*4 are arranged sequentially in the width direction. In the conveying direction, the third rib 123*a*3 has a third upstream end and a third downstream end, and the fourth rib 123$a$4 has a fourth upstream end and a fourth downstream end. The positional relationship between the second rib 123$a$2 and the third rib 123$a$3 and the positional relationship between the third rib 123$a$3 and the fourth rib 123$a$4 are the same as the positional relationship between the first rib 123$a$1 and the second rib 123$a$2. Further, the downstream end of the first rib 123$a$1 is positioned on the upstream side of the upstream end of the third rib 123$a$3. As described above, the first rib 123$a$1, the second rib 123$a$2, the third rib 123$a$3, and the fourth rib 123$a$4 are arranged from the upstream side to the downstream side in the conveying direction of the conveying sheet S.

In the first conveying guide 123 of the present embodiment, a multiplicity of the conveying ribs 123$a$ arranged in the same positional relationship as that of the region A described above is provided in the width direction. That is, a plurality of the first ribs 123$a$1, the second ribs 123$a$2, the third ribs 123$a$3, and the fourth ribs 123$a$4 are provided. Note that the first ribs 123$a$1, the second ribs 123$a$2, the third ribs 123$a$3, and the fourth ribs 123$a$4 arranged in regions other than the region A on the curved portion 123$b$ do not need to be arranged in completely the same positional relationship as that of the region A. For example, various changes are possible without hindering the conveyance of a conveying sheet like a configuration in which the second ribs 123$a$2 are provided on both sides in the width direction of the first rib 123$a$1. The conveying ribs 123$a$ extend along the conveying direction, and the curved portion 123$b$ is curved from the upstream side to the downstream side in the conveying direction. With this configuration, it is possible to form the conveying ribs 123$a$ on the curved portion 123$b$ when manufacturing the first conveying guide 123 by injection molding. Meanwhile, since the plurality of conveying ribs 123$a$ are arranged discretely in the width direction and the conveying direction, it is possible to suppress the occurrence of a printing problem resulting from water droplets adhering to a recording material as will be described later. The effect of suppressing the occurrence of a printing problem resulting from water droplets will be described in detail later. Note that in the present invention, the length, shape, and arrangement position of a conveying guide are not limited to the configuration of the present embodiment and various changes are possible without hindering the conveyance of a conveying sheet. For example, the region A of the first conveying guide 123 is curved in its entire region in the conveying direction but may partially have a portion extending linearly.

Figure 6A:
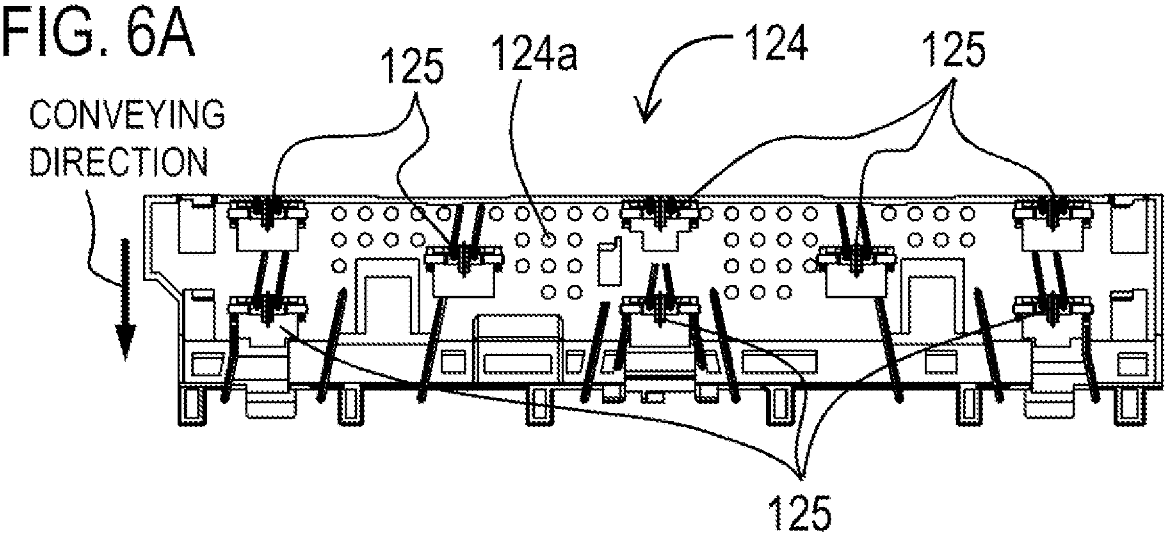
FIGS. 6A and 6B are views showing a second conveying guide according to the first embodiment.
Figure 6B:
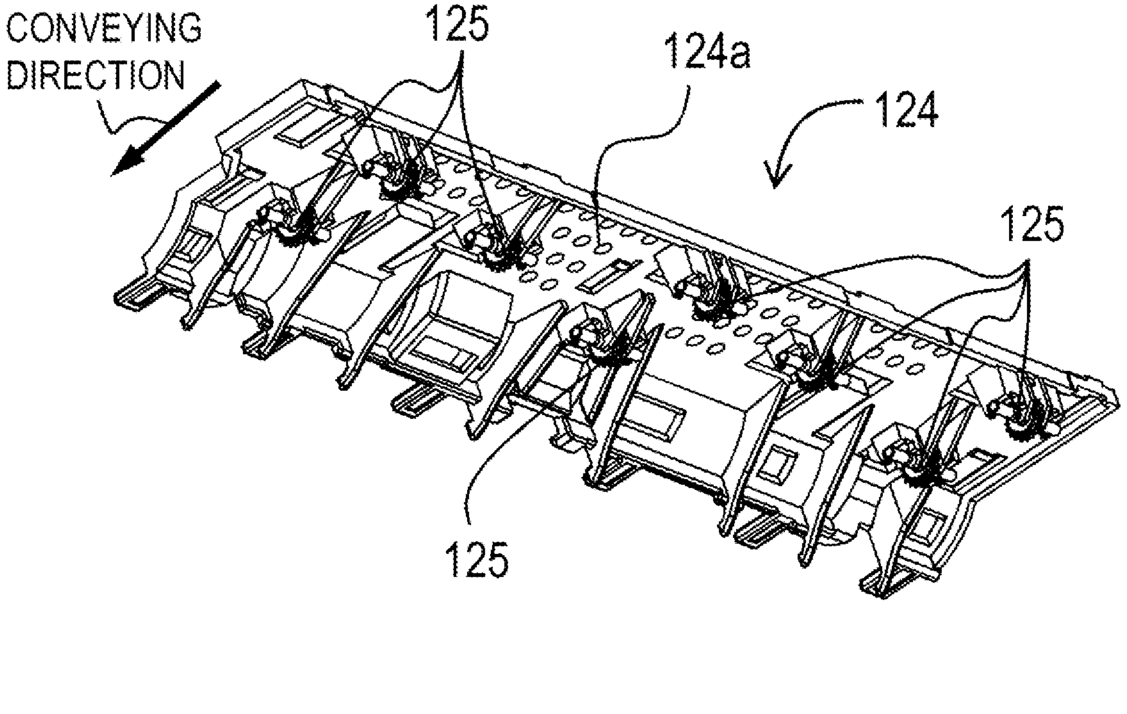

FIG. 6A is a front view of the second conveying guide 124. FIG. 6B is a perspective view of the second conveying guide 124. Spurs (rollers, rotating bodies) 125 are attached to the second conveying guide 124 facing the first conveying guide 123 in the conveying path. In the present embodiment, eight spurs 125 are provided on the second conveying guide 124 so as to face the first conveying guide 123, and the respective spurs 125 are arranged to be deviated from each other in the conveying direction or the width direction. Moreover, a plurality of ventilation holes 124$a$ are bored in the second conveying guide 124. With the ventilation holes 124$a$, it is possible to discharge water vapor generated at the fixation portion 12 to the outside of the apparatus. Further, the second conveying guide 124 is attached and fixed to an exterior cover 126.

Figure 7A:
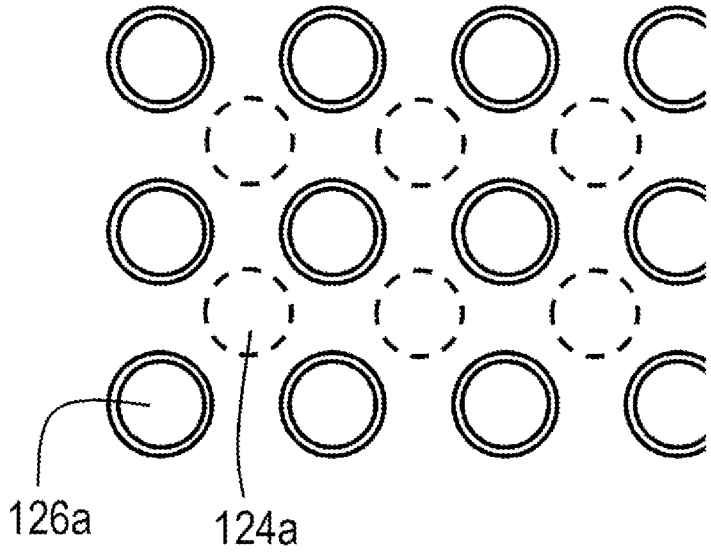
FIGS. 7A and 7B are views showing the positional relationship between ventilation holes according to the first embodiment.
Figure 7B:
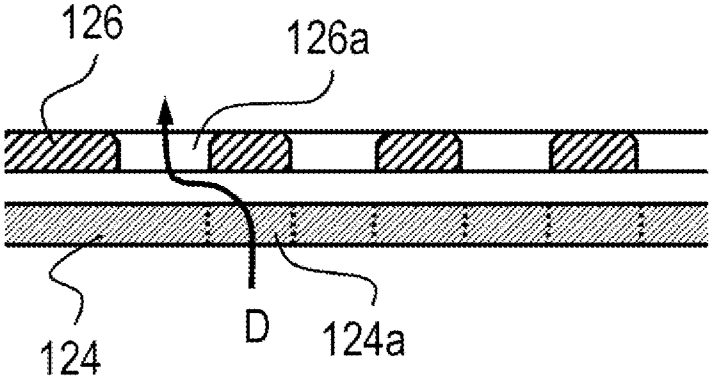

FIG. 7A is a plan view of the exterior cover 126 covering the upper surface of the image forming apparatus 100 when seen from its top surface side and shows the positional relationship between ventilation holes 126$a$ of the exterior cover 126 and the ventilation holes 124$a$ of the second conveying guide 124. FIG. 7B is a cross-sectional view of the exterior cover 126 and the second conveying guide 124. Like the second conveying guide 124, the plurality of ventilation holes 126$a$ are bored in the exterior cover 126. As shown in FIG. 7A, the ventilation holes 126$a$ of the exterior cover 126 and the ventilation holes 124$a$ of the second conveying guide 124 are arranged at positions deviated from each other when seen from the top surface side. With the arrangement of the ventilation holes 126$a$ of the exterior cover 126 and the ventilation holes 124$a$ of the second conveying guide 124 like this, water vapor moves in a direction as indicated by an arrow D shown in FIG. 7B and is discharged to the outside of the apparatus, while foreign matter from the top surface is prevented from entering the image forming apparatus.

On the downstream side in the conveying direction of the second conveying guide 124, a rear surface conveying guide 115$a$ integrally formed with the rear surface door 115 is provided facing the first conveying guide 123. By the first conveying guide 123, the second conveying guide 124, and the rear surface conveying guide 115$a$, the conveying sheet S of which the first side has completed image fixation at double-sided printing is guided to the image forming portion 11 again.

Transport Path of Transport Sheet at Single-Sided Printing

Figure 8A:
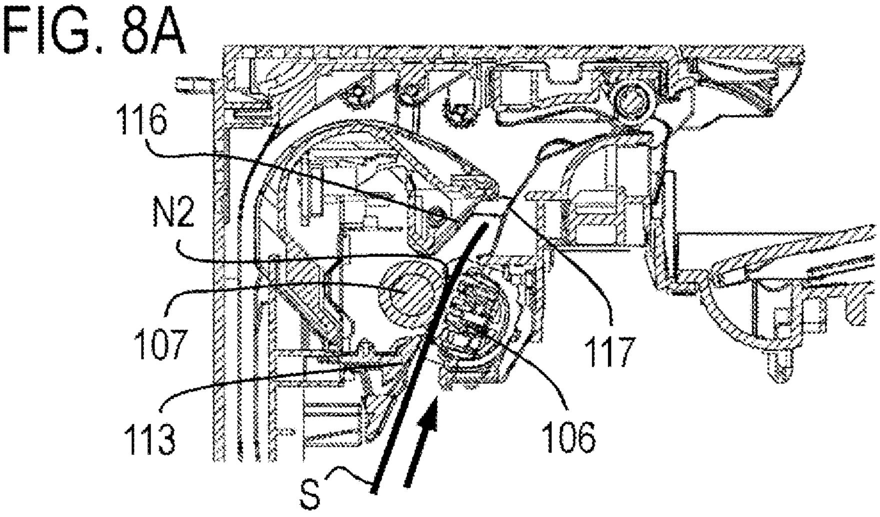
FIGS. 8A to 8C are views showing the conveying path of a conveying sheet at single-sided printing according to the first embodiment.
Figure 8B:
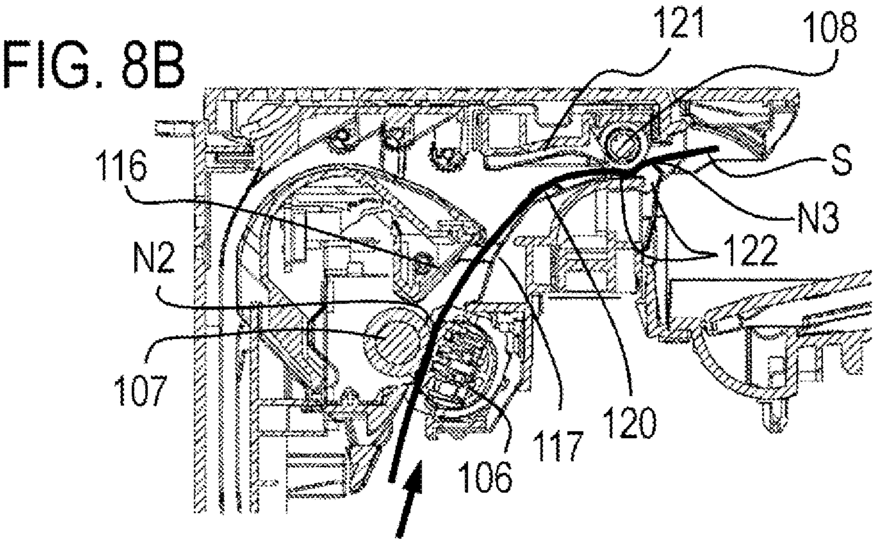
Figure 8C:
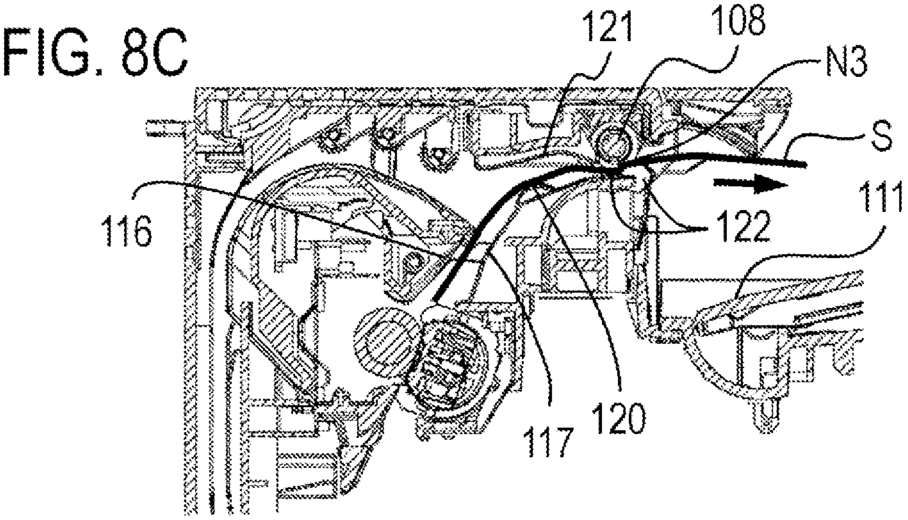

The conveying path of the conveying sheet S at single-sided printing will be described using FIGS. 8A to 8C. FIG. 8A shows a state in which the conveying sheet S is conveyed to the fixation nip portion N2. FIG. 8B shows a state in which the conveying sheet S is conveyed to the sheet discharging nip portion N3. FIG. 8C shows a state in which the conveying sheet S is discharged to the sheet discharging tray 111.

First, an image is transferred onto the conveying sheet S fed from the feeding-sheet loading tray 109 by the photosensitive drum 101 and the transfer roller 105 at the transfer nip portion N1 of the image forming portion 11. Then, the conveying sheet S is guided to the entrance guide 113 and conveyed to the fixation nip portion N2 formed by the film unit 106 and the pressing roller 107. By being heated and pressed at the fixation nip portion N2, toner transferred onto the conveying sheet S is fixed. After the fixation, the conveying sheet S is conveyed to the sheet discharging nip portion N3 while being guided by the separation guide 116 and the sheet discharging lower guide 117. Even in a case in which water droplets adhere onto the conveying ribs 116$a$ of the separation guide 116, it is possible to disperse water droplets adhering to the conveying sheet S in the width direction and suppress the occurrence of a printing problem since the conveying ribs 116$a$ are provided obliquely with respect to the conveying direction.

The conveying sheet S is guided by the sheet discharging upper guide 121 and conveyed to the sheet discharging nip portion N3 formed by the sheet discharging roller 108 and the sheet discharging rollers 122. Even in a case in which water droplets adhere onto the conveying ribs 121$a$ of the sheet discharging upper guide 121, it is possible to disperse water droplets adhering to the conveying sheet S in the width direction and suppress the occurrence of a printing problem since the conveying ribs 121$a$ are provided obliquely with respect to the conveying direction. At this time, the tip end of the conveying sheet S enters the sheet discharging nip portion N3 but the rear end thereof is held by the fixation nip portion N2. Here, the conveying speed of the sheet discharging roller 108 is set to be faster than that of the pressing roller 107, and the conveying sheet S is set to be pulled in the conveying direction. Since a tensile force is applied to the conveying sheet S, the conveying sheet S may strongly rub against conveying ribs provided on the sheet discharging lower guide 117. Therefore, with the sheet discharging lower guide roller 120 provided on the sheet discharging lower guide 117, a fixed image on the conveying sheet S is prevented from being peeled away by the conveying ribs on the sheet discharging lower guide 117. After the rear end of the conveying sheet S passes through the fixation nip portion N2, the conveying sheet S is conveyed by the sheet discharging roller 108 and the sheet discharging rollers 122 at the sheet discharging nip portion N3 and discharged onto the sheet discharging tray 111.

Transport Path of Transport Sheet at Double-Sided Printing

Figure 9A:
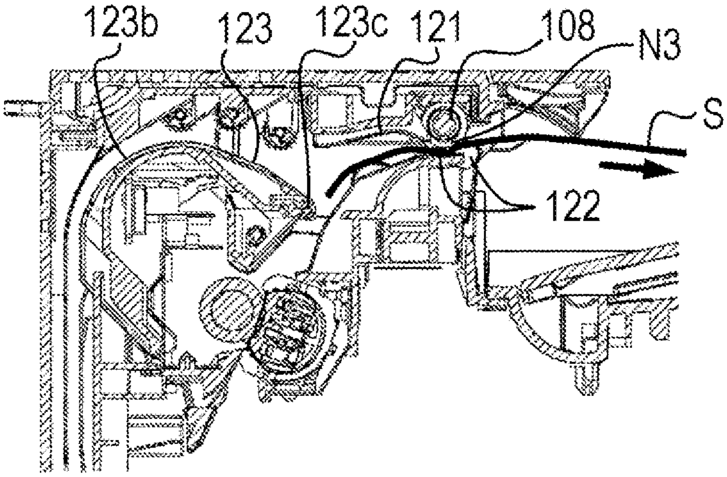
FIGS. 9A to 9C are views showing the conveying path of the conveying sheet at double-sided printing according to the first embodiment.
Figure 9B:
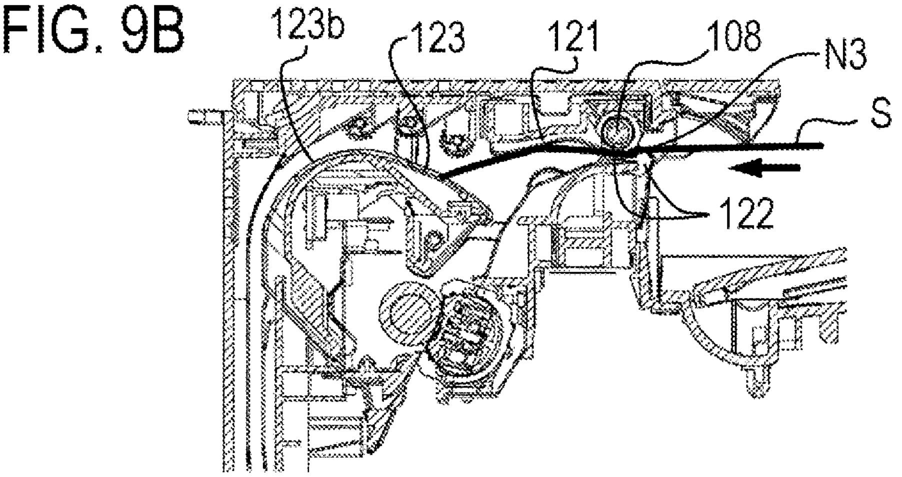
Figure 9C:
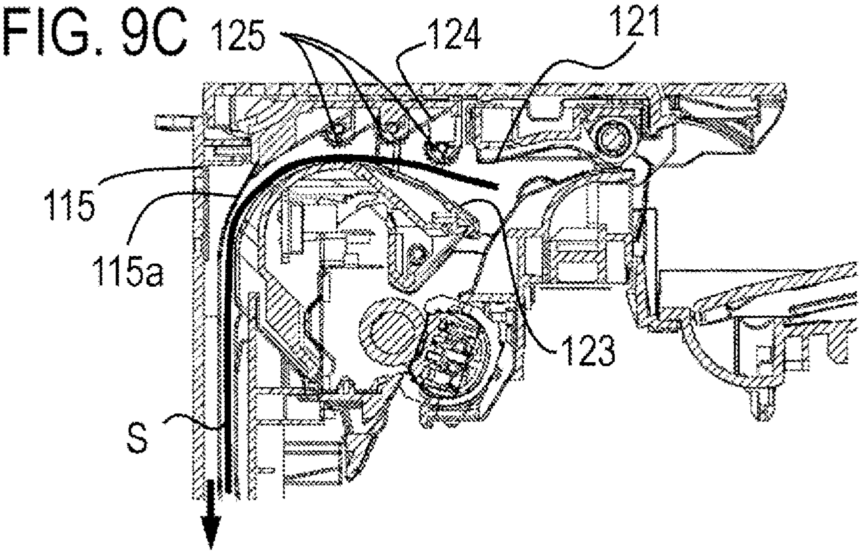

The conveying path of the conveying sheet S at double-sided printing will be described using FIGS. 9A to 9C and FIG. 10. Since a conveying path before the rear end of the conveying sheet S passes through the fixation nip portion after the completion of image fixation on the first side of the conveying sheet S is the same as the conveying path at single-sided printing, its description will be omitted. The subsequent conveying path of the conveying sheet S will be described. FIG. 9A shows a state after the conveying sheet S has passed through the fixation nip portion N2. FIG. 9B shows a state in which the conveying sheet S is conveyed as the sheet discharging roller 108 reversely rotates. FIG. 9C shows a state in which the conveying sheet S moves along the curved path after having passed through the sheet discharging nip portion N3.

A conveying path in which the conveying sheet S of which the first side has completed image fixation is conveyed to the image forming portion 11 again in order to have an image transferred onto its second side that is on the back side of the first side will be described. When the rear end of the conveying sheet S passes through the tip end portion 123*c* of the first conveying guide 123 after the conveying sheet S has passed through the fixation nip portion N2, the sheet discharging roller 108 reversely rotates. As the sheet discharging roller 108 reversely rotates, the rear end (hereinafter called the tip end of the second side) of the conveying sheet S is guided and conveyed by the first conveying guide 123 forming the curved path. At this time, the conveying sheet S passes through an upper side in a vertical direction with respect to the conveying ribs 123*a* protruding from the first conveying guide 123 positioned on the inner peripheral side of the curved path. Therefore, the conveying sheet S is conveyed so as to rub against the conveying ribs 123*a*. Then, water droplets adhering to the tip ends of the conveying ribs 123*a* of the first conveying guide 123 are wiped off by the tip end of the second side of the conveying sheet S. In a case in which the conveying ribs provided on the curved portion extend long along the conveying direction, a large amount of water droplets adhere to the same spot in the width direction of the tip end of a conveying sheet. If a large amount of water droplets adhere to a conveying sheet as described above, the water droplets are not completely evaporated before the conveying sheet enters the image forming portion and adhere to the photosensitive drum as well. The adhesion of water droplets to the photosensitive drum becomes a factor for a printing problem. At the double-sided printing, it is important to prevent water droplets from intensively adhering from the conveying ribs to a conveying sheet at the same spot of the conveying sheet on the curved path.

In the first conveying guide 123 according to the present embodiment, the conveying ribs 123*a* extending short along the conveying direction are provided in plurality and discretely in the conveying direction and the width direction so as to be spaced apart from each other. Accordingly, even in a case in which water droplets adhere onto the conveying ribs 123*a* and the tip end of the second side of the conveying sheet S wipes off the water droplets, a large amount of water droplets are prevented from intensively adhering to the same spot in the width direction of the conveying sheet S. That is, according to the present invention, water droplets adhering from the conveying ribs to a conveying sheet are dispersed in the width direction to be made small in size and evaporated before the conveying sheet enters the image fixation portion again. Therefore, it is possible to suppress the adhesion of water droplets to the photosensitive drum. Moreover, it is also possible to suppress the occurrence of other printing problems such as an image defect due to a toner image stain resulting from the adhesion of water droplets and a sheet jam caused by sheet deformation.

In the conveying path for double-sided printing, the conveying sheet S is guided and conveyed not only by the conveying ribs 123*a* on the first conveying guide 123 but also by the spurs 125 of the second conveying guide 124. Moreover, on the downstream side in the conveying direction of the second conveying guide 124, the conveying sheet S is guided and conveyed toward the image forming portion 11 by the rear surface conveying guide 115*a* integrally formed with the rear surface door 115. As described above, the conveying ribs 121*a* of the sheet discharging upper guide 121 are arranged obliquely with respect to the conveying direction, and the spurs 125 convey the conveying sheet S while rotating. Moreover, a plurality of protrusions are formed on the surfaces of the spurs 125, and the tip ends of the protrusions contact the conveying sheet S. Therefore, it is possible to suppress a large amount of water droplets from intensively adhering to the same spot of the conveying sheet S.

Figure 10:
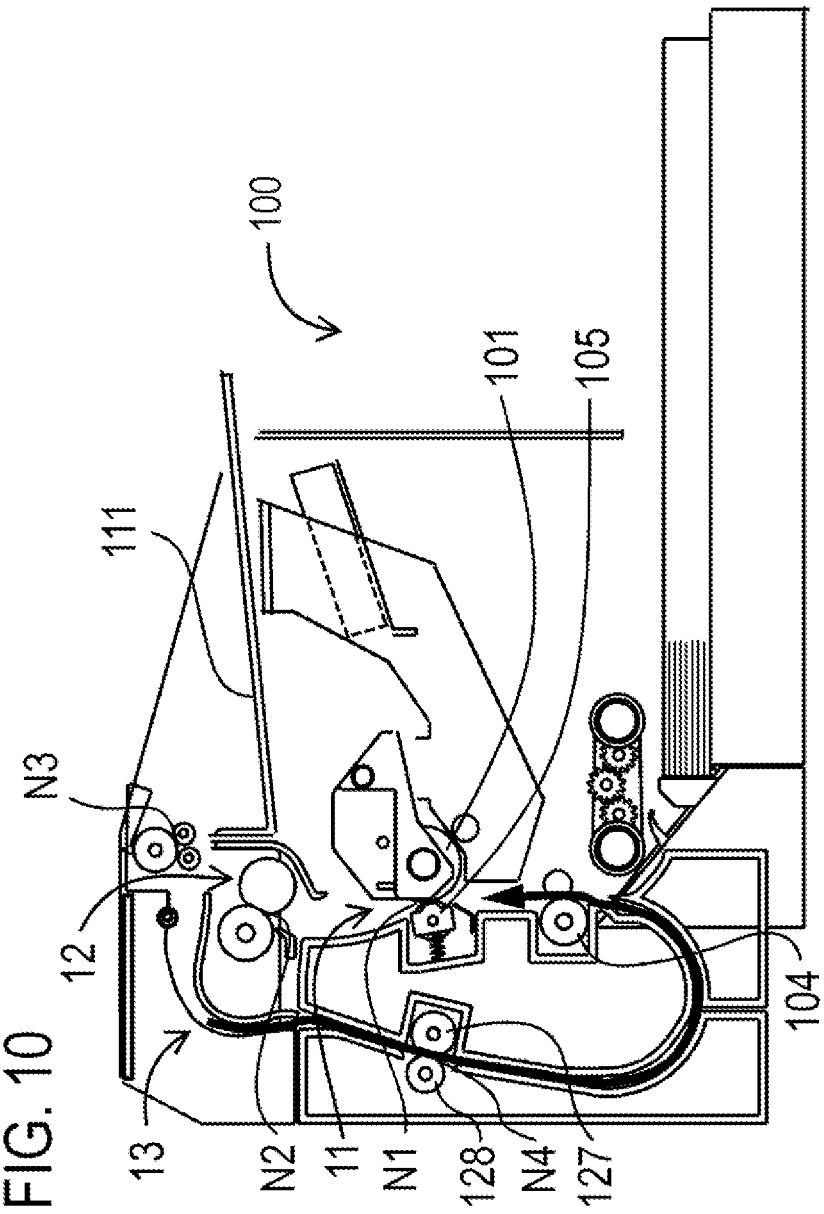
FIG. 10 is a view showing a conveying path before an image is formed on a second side according to the first embodiment.

FIG. 10 shows by an arrow a conveying path to the image forming portion 11 for double-sided printing on which the conveying sheet S passes at the double-sided printing. The conveying sheet S conveyed after having passed through the conveying ribs 123*a* or the rear surface conveying guide 115*a* then enters a conveying nip portion N4 formed by a double-sided roller 128 and a double-sided conveying roller 127 and is conveyed to the conveying roller 104 by the rotation of the double-sided roller 128. Then, after an image is formed on the second side of the conveying sheet S having entered the image forming portion 11 at a transfer nip portion N1 by the photosensitive drum 101 and the transfer roller 105, the conveying sheet S is conveyed to the fixation portion 12. After the fixation of the image at the fixation nip portion N2 of the fixation portion 12, the conveying sheet S is discharged onto the sheet discharging tray 111 through the same path as that for single-sided printing.

Effect of Invention

According to the configuration described above, it is possible to disperse water droplets adhering to a conveying sheet in a width direction even in a case in which the water droplets adhere to ribs provided on the curved portion of a conveying guide. Therefore, it is possible to suppress the occurrence of a printing problem such as an image defect resulting from the adhesion of moisture to the conveying sheet.

Note that the present embodiment has a configuration in which a plurality of conveying ribs provided on the curved portion of a conveying guide include intermittently-arranged conveying ribs. However, the present invention is not limited to the configuration shown in FIG. 5B. The conveying ribs may be regularly or irregularly arranged on the curved portion, and various changes are possible without hindering the conveyance of a conveying sheet.

Further, in the present embodiment, the present invention is applied only to a conveying guide constituting a conveying path for double-sided printing positioned above a fixation portion among conveying guides constituting a sheet conveying device. However, the present invention is applicable not only to the above conveying guide but also to various conveying guides. For example, the present invention is applicable not only to a sheet conveying device provided in the image forming apparatus like the present embodiment but also to a conveying guide provided in a sheet conveying device in a sheet discharging apparatus capable of being externally added to an image forming apparatus. The adhesion of water droplets to conveying ribs varies depending on a use environment or the arrangement relationship between respective members. Therefore, with the conveying ribs appropriately arranged on respective conveying guides according to an apparatus configuration or the like, the effect of suppressing the occurrence of a printing problem is effectively obtained.

Second Embodiment

Next, a second conveying guide 224 according to a second embodiment will be described using FIG. 11 and FIGS. 12A and 12B. In the second embodiment, the same configurations as those of the first embodiment will be denoted by the same symbols, and their descriptions will be omitted. The second conveying guide 224 of the present embodiment is different from that of the first embodiment in that nonwoven fabrics are provided instead of spurs.

Figure 11:
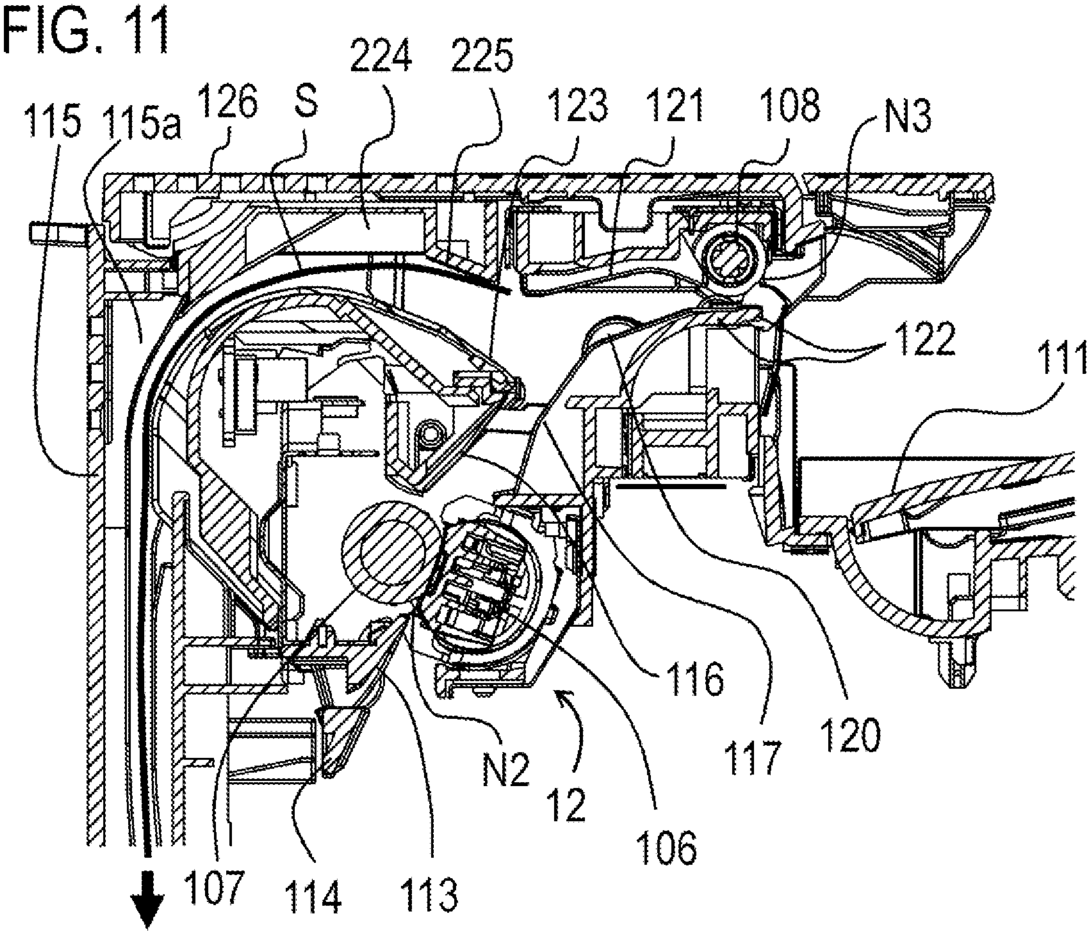
FIG. 11 is a cross-sectional view of a fixation portion and peripheral members according to a second embodiment.
Figure 12A:
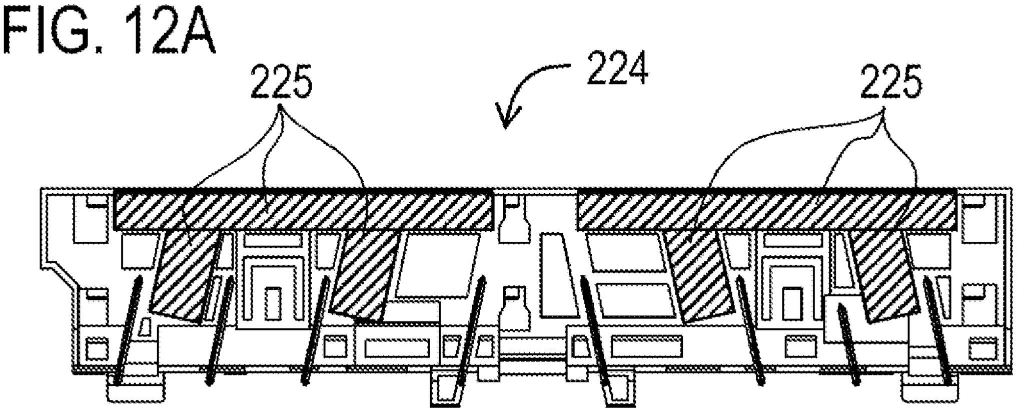
FIGS. 12A and 12B are a front view and a perspective view of a second conveying guide according to the second embodiment.
Figure 12B:
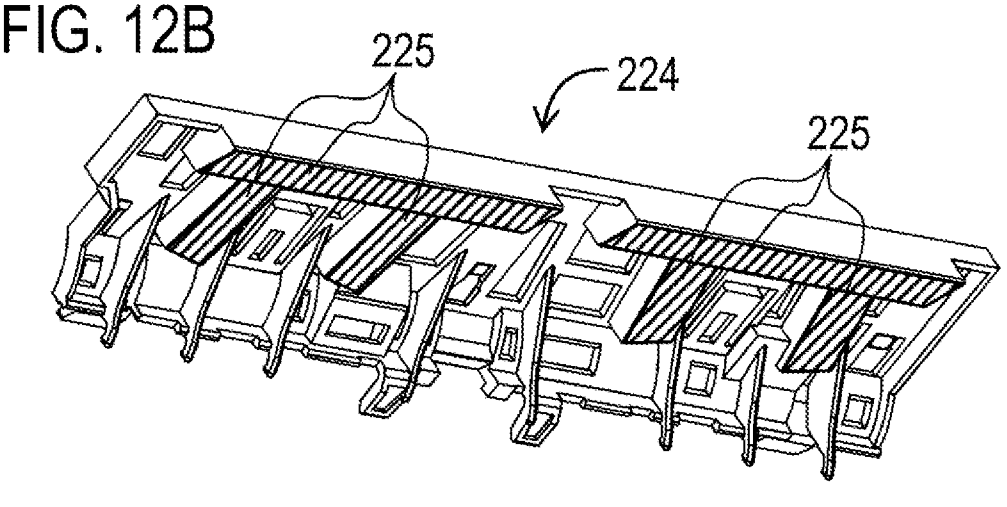

FIG. 11 is a cross-sectional view showing a fixation portion 12 and peripheral members in the present embodiment. FIG. 12A is a front view of the second conveying guide 224 according to the present embodiment. FIG. 12B is a perspective view of the second conveying guide 224. Nonwoven fabrics 225 are affixed at six places of the second conveying guide 224. In FIGS. 12A and 12B, the nonwoven fabrics 225 are hatched for the sake of clarity.

Transport Path of Transport Sheet at Double-Sided Printing

The conveying path of a conveying sheet at single-sided printing of the present embodiment is the same as that of the first embodiment. Further, the conveying path of a conveying sheet at double-sided printing of the present embodiment is also the same as that of the first embodiment except that the second conveying guide 224 is provided with the nonwoven fabrics 225 serving as moisture absorbing members instead of spurs. In the second conveying guide 224, the nonwoven fabrics 225 are provided facing a first conveying guide 123. In the present embodiment, a conveying sheet S of which the first side has completed image fixation at double-sided printing moves along a conveying path for the double-sided printing while being guided by the nonwoven fabrics 225 on the second conveying guide 224 provided facing the first conveying guide 123.

Effect of Invention

Since nonwoven fabrics have the property of absorbing moisture, water droplets do not turn into a drop shape on the nonwoven fabrics unlike a case in which the water droplets adhere onto conveying ribs. Therefore, even in a case in which moisture evaporates as the conveying sheet S is heated at the fixation portion 12, water droplets do not appear on the nonwoven fabrics 225, and a large amount of water droplets do not adhere from the nonwoven fabrics 225 to the conveying sheet S. Therefore, it is possible to suppress the occurrence of a printing problem due to the adhesion of water droplets to a conveying sheet. Even if a small amount of moisture adheres from the nonwoven fabrics 225 to the conveying sheet S, the moisture on the conveying sheet evaporates before the conveying sheet S enters a photosensitive drum 101 again. Therefore, a printing problem due to the adhesion of water droplets to the conveying sheet does not occur. Further, with the arrangement of the nonwoven fabrics 225, the effect of wiping off moisture on the conveying sheet S with the nonwoven fabrics 225 is also expectable when water droplets adhere to the conveying sheet S on the upstream side in a conveying direction of the second conveying guide 224. Note that nonwoven fabrics are used as moisture absorbing members in the present embodiment but members such as water absorbing sponges capable of absorbing moisture may also be used.

According to the configuration described above, it is possible to disperse water droplets adhering to a conveying sheet in a width direction and wipe off water droplets adhering on the upstream side in the conveying direction of a conveying guide even in a case in which the water droplets adhere to conveying ribs on the curved conveying guide. According to the present invention, it is possible to suppress the occurrence of a printing problem such as an image defect resulting from the adhesion of water droplets to a conveying sheet even in a case in which a curved conveying path is provided.

Note that the first embodiment has a configuration in which only spurs are provided as rollers facing a conveying guide having a curved portion in a conveying path, and the second embodiment has a configuration in which only nonwoven fabrics are provided as moisture absorbing members. However, the application of the present invention is not limited to the configurations. For example, both rollers and moisture absorbing members may be provided facing a conveying guide. The provision of one or both of rollers and moisture absorbing members may only be adequately determined in consideration of their manufacturing costs, manufacturing difficulties, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-199604, filed on Dec. 8, 2021, which is hereby incorporated by reference herein in its entirety.

What is claimed is:

1. A sheet conveying device provided in an image forming apparatus, the image forming apparatus having an image forming portion that forms an image on a sheet-shaped recording material and a heating portion that heats the recording material, the sheet conveying device comprising:

a conveying portion configured to convey the recording material; and an injection-molded first conveying guide, the first conveying guide forming a conveying path, through which the recording material passes, above the heating portion and having (i) a curved portion for forming a curved path in at least a part of the conveying path and (ii) a plurality of ribs provided on a surface of the curved portion configured to face and contact the recording material, wherein each of the plurality of ribs extends along a conveying direction of the recording material, and the plurality of ribs includes a first rib and a second rib adjacent to the first rib, wherein the second rib is arranged to be deviated from the first rib in a width direction orthogonal to the conveying direction and in the conveying direction, so as to be spaced apart from the first rib, and wherein, in the conveying direction, the first rib has a first upstream end and a first downstream end and the second rib has a second upstream end and a second downstream end, the second upstream end being positioned between the first upstream end and the first downstream end, the first downstream end being positioned between the second upstream end and the second downstream end.

2. The sheet conveying device according to claim 1, wherein the plurality of ribs are arranged discretely on the curved portion in the width direction and in a sheet passing region of the recording material having a maximum passable size.

3. The sheet conveying device according to claim 1, wherein the plurality of ribs are arranged discretely on the curved portion in the conveying direction.

4. The sheet conveying device according to claim 1, wherein each of the plurality of ribs has a length in the conveying direction shorter than a length of the curved portion in the conveying direction.

5. The sheet conveying device according to claim 1, wherein the plurality of ribs includes a third rib adjacent to the second rib, the third rib being arranged to be deviated from the second rib in the width direction and in the conveying direction, so as to be spaced apart from the second rib.

6. The sheet conveying device according to claim 5, wherein in the conveying direction, the third rib has a third upstream end and a third downstream end, the third upstream end being positioned between the second upstream end and the second downstream end, the second downstream end being positioned between the third upstream end and the third downstream end.

7. The sheet conveying device according to claim 1, wherein the surface of the curved portion configured to face the recording material is curved in a protruding shape.

8. The sheet conveying device according to claim 1, further comprising a plurality of rollers provided facing the first conveying guide in the conveying path.

9. The sheet conveying device according to claim 8, wherein each of the plurality of rollers includes a plurality of protrusions configured to contact the recording material.

10. The sheet conveying device according to claim 9, wherein the plurality of rollers are arranged to be deviated from each other in the conveying direction.

11. The sheet conveying device according to claim 1, further comprising a moisture absorbing member provided facing the first conveying guide in the conveying path.

12. The sheet conveying device according to claim 11, wherein the moisture absorbing member is a nonwoven fabric.

13. The sheet conveying device according to claim 1, further comprising a second conveying guide facing the first conveying guide, wherein the second conveying guide includes a plurality of first holes.

14. The sheet conveying device according to claim 13, further comprising a cover facing the second conveying guide, wherein the cover includes a plurality of second holes, and wherein the plurality of first holes and the plurality of second holes are arranged to be deviated from each other as seen from above.

15. The sheet conveying device according to claim 1, further comprising a guide member configured to guide the recording material, the guide member being arranged on a downstream side of the heating portion and an upstream side of the conveying path in the conveying direction, wherein the guide member includes (i) a conveying rib inclined with respect to the conveying direction and (ii) a ventilation hole.

16. The sheet conveying device according to claim 1, wherein the conveying path is a path for double-sided printing, and wherein the conveying portion includes a roller configured to rotate toward a first direction and a second direction opposite to the first direction, the roller being configured to convey the recording material which has passed through the heating portion by rotating in the first direction, and to convey the recording material to the conveying path by rotating in the second direction.

17. An image forming apparatus comprising:

an image forming portion configured to form an image on a recording material;

a heating portion configured to heat the recording material; and a sheet conveying device, the sheet conveying device comprising:

a conveying portion configured to convey the recording material; and a first conveying guide, the first conveying guide forming a conveying path, through which the recording material passes, above the heating portion and having (i) a curved portion for forming a curved path in at least a part of the conveying path and (ii) a plurality of ribs provided on a surface of the curved portion configured to face and contact the recording material, wherein each of the plurality of ribs extends along a conveying direction of the recording material, and the plurality of ribs includes a first rib and a second rib adjacent to the first rib, wherein the second rib is arranged to be deviated from the first rib in a width direction orthogonal to the conveying direction and in the conveying direction, so as to be spaced apart from the first rib, and wherein, in the conveying direction, the first rib has a first upstream end and a first downstream end and the second rib has a second upstream end and a second downstream end, the second upstream end being positioned between the first upstream end and the first downstream end, the first downstream end being positioned between the second upstream end and the second downstream end.

18. The image forming apparatus according to claim 17, wherein the plurality of ribs includes a third rib adjacent to the second rib, the third rib being arranged to be deviated from the second rib in the width direction and in the conveying direction, so as to be spaced apart from the second rib, and wherein, in the conveying direction, the third rib has a third upstream end and a third downstream end, the third upstream end being positioned between the second upstream end and the second downstream end, the second downstream end being positioned between the third upstream end and the third downstream end.

19. The image forming apparatus according to claim 18, wherein the conveying path is a path for double-sided printing, and wherein the conveying portion includes a roller configured to rotate toward a first direction and a second direction opposite to the first direction, the roller being configured to convey the recording material which has passed through the heating portion by rotating in the first direction, and to convey the recording material to the conveying path by rotating in the second direction.

20. The image forming apparatus according to claim 17, wherein the conveying path is a path for double-sided printing, and wherein the conveying portion includes a roller configured to rotate toward a first direction and a second direction opposite to the first direction, the roller being configured to convey the recording material which has passed through the heating portion by rotating in the first direction, and to convey the recording material to the conveying path by rotating in the second direction.

* * * * *